United States Patent [19]

Yamane

[11] Patent Number: 5,102,188
[45] Date of Patent: Apr. 7, 1992

[54] VEHICLE BODY STRUCTURE PRODUCING METHOD AND FLOWABLE RESIN DAMMING ARRANGEMENT THEREFOR

[75] Inventor: Yukio Yamane, Ebina, Japan

[73] Assignee: Nissan Motor Co., Ltd., Yokohama, Japan

[21] Appl. No.: 456,692

[22] Filed: Dec. 26, 1989

[30] Foreign Application Priority Data

Dec. 28, 1988 [JP] Japan .................. 63-332509

[51] Int. Cl.⁵ .............................................. B60J 5/00
[52] U.S. Cl. ................................... 296/205; 296/187; 296/901
[58] Field of Search ............. 296/901, 39.1, 39.3, 296/187, 205; 52/309.8, 309.9, 309.11; 293/109, 120

[56] References Cited

U.S. PATENT DOCUMENTS

| | | | |
|---|---|---|---|
| 3,199,261 | 8/1965 | Soddy | 52/309.11 X |
| 4,017,117 | 4/1977 | Eggert, Jr. | 296/901 X |
| 4,101,704 | 7/1978 | Hiles | 296/901 X |
| 4,440,434 | 4/1984 | Celli | 296/901 X |
| 4,491,362 | 1/1985 | Kennedy | 296/901 X |
| 4,573,707 | 3/1986 | Pabst | 296/901 X |
| 4,613,177 | 9/1986 | Loren et al. | 293/109 X |
| 4,705,716 | 11/1987 | Tang | 296/901 X |
| 4,863,771 | 9/1989 | Freeman | 296/205 X |
| 4,917,435 | 4/1990 | Bonnett et al. | 296/901 X |

FOREIGN PATENT DOCUMENTS

| | | | |
|---|---|---|---|
| 949611 | 6/1974 | Canada | 293/109 |
| 56-155975 | 4/1955 | Japan . | |
| 61-16509 | 6/1986 | Japan . | |
| 279125 | 12/1987 | Japan | 293/109 |

*Primary Examiner*—Margaret A. Focarino
*Assistant Examiner*—Joseph D. Pape
*Attorney, Agent, or Firm*—Pennie & Edmonds

[57] ABSTRACT

A method of producing a vehicle body structure having a pipe-shaped structural part reinforced with a hard and high density foamed polyurethane resin. The method is carried out as follows: First, a plurality of pressed panels are prepared, the pressed panels being to be joined to form the pipe-shaped structural part. A band-shaped foamable rubber which has not yet foamed is attached onto the inner surface of each of a plurality of panels at a predetermined position. The panels are joined to form the pipe-shaped structural part. The foamable rubber is foamed under heating in a painting step to form a foamed rubber at the predetermined position. Then, a foamed member of a soft foamed polyurethane resin is inserted into an opening formed within the pipe-shaped structural part and defined by the foamed rubber in order to constitute a dam section for blocking the pipe-shaped structural part at the predetermined position. Thereafter, the material of a hard and high density foamed polyurethane resin is poured into a space defined by the dam section within the pipe-shaped structural part and hardened within the pipe-shaped structural part.

9 Claims, 4 Drawing Sheets

VEHICLE BODY STRUCTURE PRODUCING METHOD AND FLOWABLE RESIN DAMMING ARRANGEMENT THEREFOR

BACKGROUND OF THE INVENTION

1. Field of the Invention

This invention relates to improvements in a method of producing a vehicle body structure reinforced by supplying a foamed resin therein, and in an arrangement for damming a flowable resin material of the foamed resin, to be used in the vehicle body structure producing method.

2. Description of the Prior Art

In the field of automotive industries, it is known that a foamed resin material such as foamed polyurethane resin is poured into confined spaces formed in an automotive vehicle body and is hardened within each confined space for the purpose of interrupting noise and vibration transmission, as disclosed in Japanese Patent Provisional Publication No. 61-116509. In connection with this, a damming arrangement has been proposed to dam the flowable resin material poured into the vehicle body at a desired position, as disclosed in Japanese Utility Model Publication No. 56-155975. In this damming arrangement, a part of a vehicle body panel (formed of steel plate) constituting a vehicle body pillar or the like is bent to form a dam wall of the shape corresponding to the cross-section of the pillar or the like. This dam wall blocks the inside space of the pillar or the like thereby to dam the flowing resin material poured into the inside space.

As mentioned above, many methods of pouring the foamed resin material into the confined space in the vehicle body are known; however, almost all the methods are intended to interrupt the transmission of noise and vibration. Accordingly, a relatively soft and low density foamed resin is used for the resin material to be filled in the confined space of the vehicle body. In this case, the foamed resin can be hardened in a desired location without using a reliable dam section.

In contrast, in case of using a relatively hard and high density foamed resin as the resin material for the purpose of reinforcing the vehicle body, the poured resin material unavoidably flows to unnecessary locations before hardening and therefore dam sections for the poured resin material is necessarily required.

If the above-mentioned damming arrangement including the dam wall formed by bending a part of vehicle body panel is employed, the end section of the vehicle body panels must be so formed bent as to correspond to the complicated cross-sectional shape of the vehicle body structure, thereby complicating the vehicle body panels thus increasing a production cost.

Additionally, when the vehicle body structure includes a generally vertically extending pillar, a water drain hose may be disposed within the pillar in an automotive vehicle provided with a sunroof. This makes it impossible to employ the above-discussed dam wall formed by bending a part of vehicle body panel. Additionally, if the confined space is defined by such a rigid dam wall (formed on steel plate) within the vehicle body structure, the rising pressure generated due to foaming of the resin material after being poured cannot be released thereby resulting in ejection of the resin material through a slight clearance at the joint of the panels.

SUMMARY OF THE INVENTION

It is an object of the present invention to provide an improved method of producing a vehicle body structure, which can provide the vehicle body structure reinforced with a relatively hard and high density foam resin and lower in production cost, while maintaining good external appearance.

Another object of the present invention is to provide an improved method of producing a vehicle body structure by which a relatively hard and high density foam resin is supplied into a desired location in the vehicle body structure while preventing the vehicle body structure from being complicated in construction.

A further object of the present invention is to provide an improved arrangement for damming a flowable resin material, by which the flowable resin material can be supplied to a desired position, preventing a body (into which the resin material is supplied) from being complicated in construction, while effectively absorbing an excessive pressure rise due to foaming of the resin material within a confined space in the body.

An aspect of the present invention resides in a method of producting a vehicle body structure which method comprises the following steps in the order named: 1) A plurality of pressed panels are prepared and joined with each other to form a pipe-shaped structural part forming part of the vehicle body structure. 2) A foamable rubber which has not yet foamed is attached onto the inner surface of each of a plurality of panels at a predetermined position. 3) The panels are joined to form the pipe-shaped structural part. 4) The foamable rubber is foamed under heating in a painting step to form a foamed rubber at the predetermined position. 5) A foamed member is inserted into an opening formed within the pipe-shaped structural part and defined by the foamed rubber to constitute a dam section for blocking the pipe-shaped structural part at the predetermined position. 6) The material of a foamed resin is poured into a space defined by the dam section within the pipe-shaped structural part. 7) The foamed resin material is hardened to obtain the foamed resin filled within the pipe-shaped structural part.

Another aspect of the present invention resides in an arrangement for damming a flowable plastic in a pipe shaped structural member. The arrangement comprises a foamed rubber attached on the inner surface of the pipe-shaped structural member. Additionally, a foamed member is inserted in an opening defined by the foamed rubber and formed inside the pipe-shaped structural member.

With the above-mentioned vehicle body structure producing method using the flowable plastic damming arrangement or dam section, first the foamable rubbers which have not yet foamed are attached to the respective panels at the predetermined position. Then these panels are assembled to form the pipe-shaped structural part of the vehicle body structure. At this stage, the foamable rubber is disposed at the inner peripheral surface of the pipe-shaped structural part. The thus assembled pipe-shaped structural part is carried to a painting line and heated after being painted. Under this heating, the foamable rubber foams in a manner to leave an opening in a position corresponding to the dam section. Subsequently, a foamed or sponge member having a suitable size is forcibly inserted into the opening of the foamed rubber, thereby constituting the dam section which substantially blocks the inside space of the pipeshaped structural part at the predetermined position. Thereafter, the material of a foamed resin is poured into the space confined by the dam section and foamed within the confined space. This foamed resin seems to flow to unnecessary places other than the confined space; however, it is effectively dammed by the dam section and hardened within the desired confined space.

Accordingly, by virtue of the dam section, even the pipe-shaped structural member having a complicated cross-sectional shape and a large cross-sectional area can be easily and completely blocked thereby effectively damming the flowing resin material. This never invites a large increase in production cost. Additionally, since the dam section is completely formed in a fitting-out step, there arises no problem even when a part such as a water drain hose is fitted in a pillar of the vehicle body structure. Furthermore, the dam section formed by the two foamed materials has a suitable pressure absorbing effect, thereby preventing ejection of the foamed resin (filled within the space confined by the dam section) through slight clearances at the joint of the panels.

DETAILED DESCRIPTION OF THE INVENTION

Figure 1:
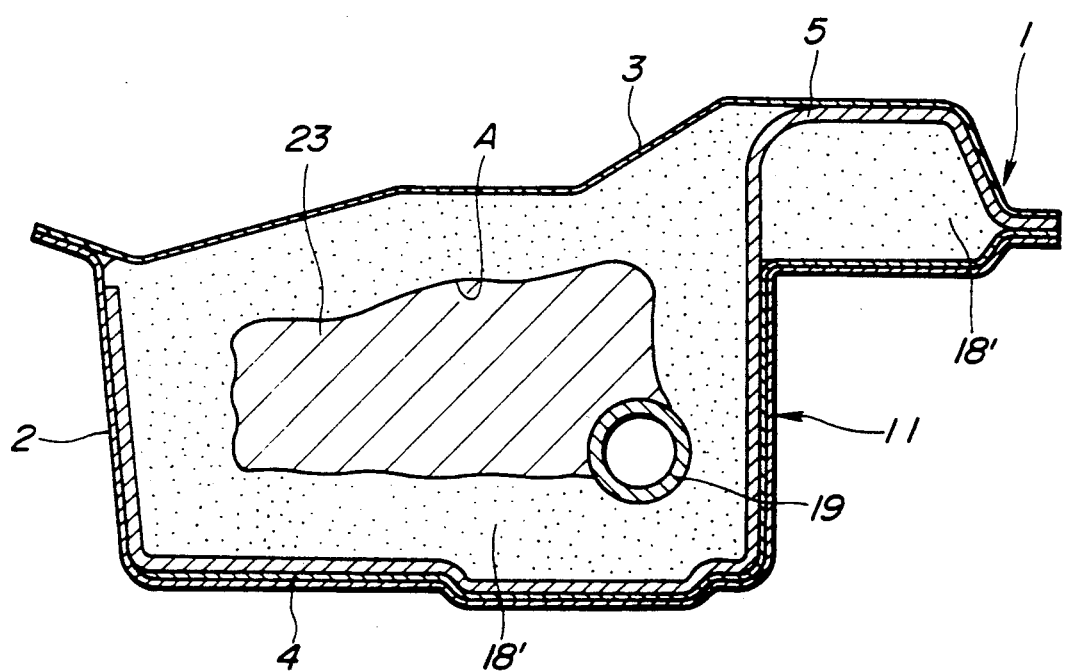
FIG. 1 is a cross-sectional view of a dam section of a first part of a vehicle body structure produced by a method according to the present invention.
Figure 2:
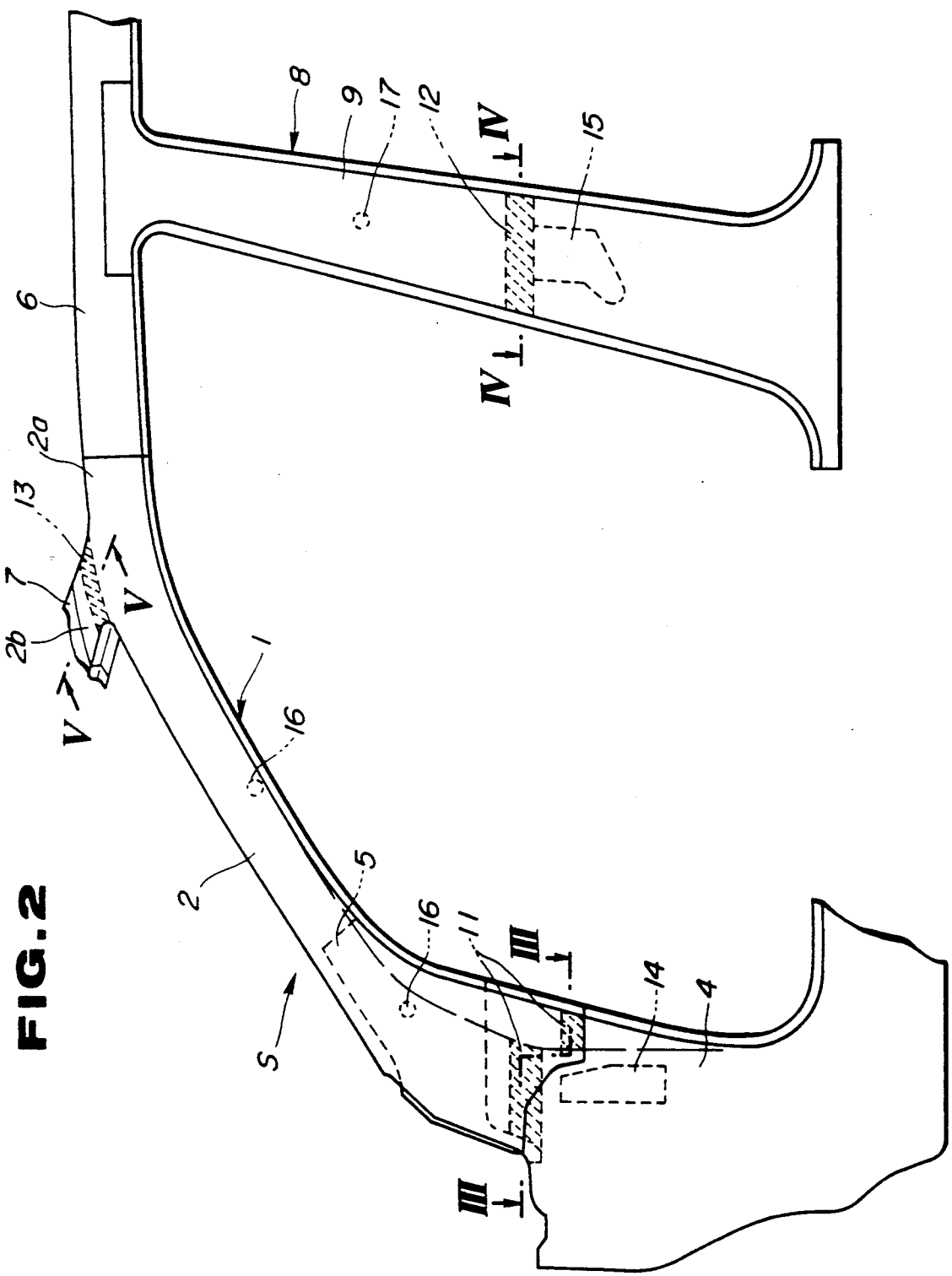
FIG. 2 is a side view of an essential part of the vehicle body structure produced by the method according to the present invention and including the dam section of FIG. 1.
Figure 3:
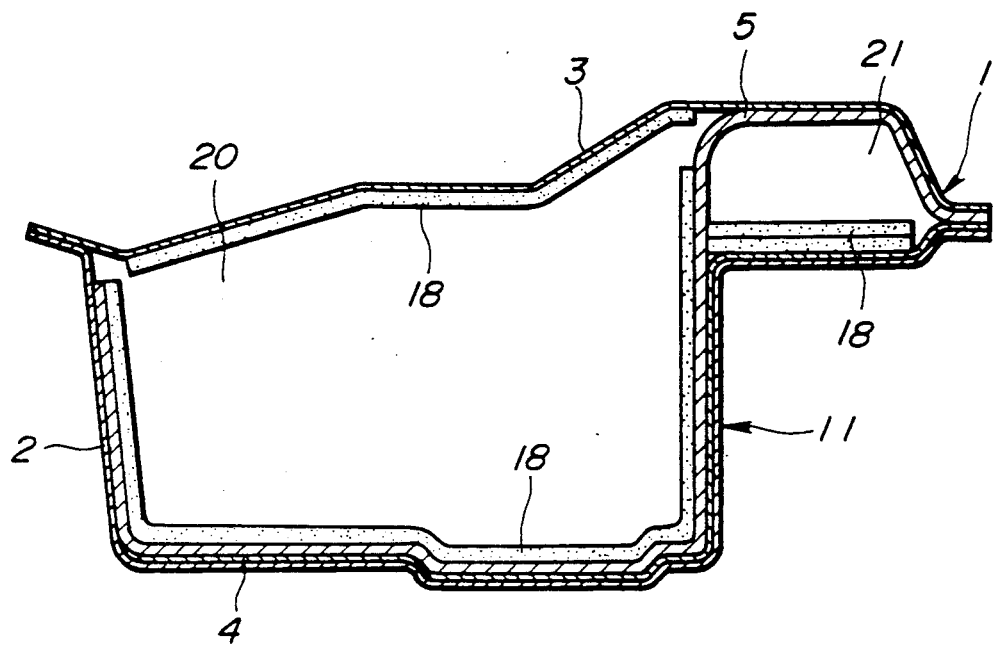
FIG. 3 is a cross-sectional view of the dam section of the first part of the vehicle body structure in a state before completion of formation of the dam section, taken in the direction of arrows substantially along the line III—III of FIG. 2.

Referring now to FIGS. 1 to 4, a vehicle body structure produced by a method according to the present invention is illustrated by the reference character S. The vehicle body structure S comprises a side part of the vehicle body as shown in FIG. 2. The vehicle body side part includes a front pillar or pipe-shaped structural part 1 which is constructed of a plurality of panels (pressed steel plates). More specifically, the front pillar includes a first section comprising an inner panel 4 and an outer panel 2, said first section having a generally C shaped cross section, as shown in FIGS. 1 and 3. The front pillar also includes a second section, comprising a single panel 3, having a generally flat shape, which is fixedly secured to the first section so as to define a vertically extending space therebetween. Additionally, a brace hinge 5 is disposed at a joint between the first and second sections, and extends along the inner surface of the first section so as to reinforce a door hinge section (not identified). The upper end section of the front pillar 1 is bifurcated to have two upper end portions 2a, 2b which are respectively fixedly secured to a roof side rail 6 and a front roof rail 7, The roof side rail 6 and the front roof rail 7 define an opening (no numeral) which is closable with a sunroof or a detachable roof panel. The inside spaces within the two upper end portions 2a, 2b are communicated with the inside spaces within the roof side rail 6 and the front roof rail 7.

Figure 4:
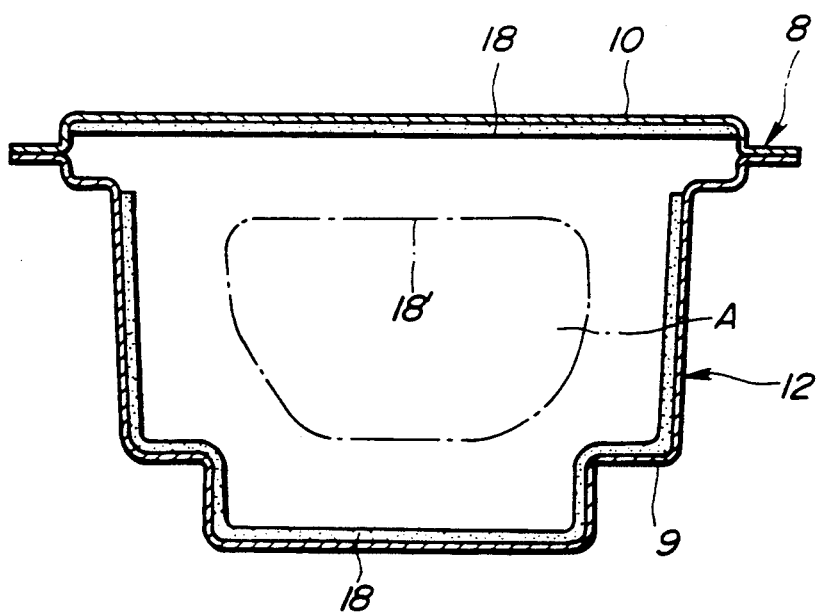
FIG. 4 is a cross-sectional view of a dam section of a second part of the vehicle body structure in a state before completion of formation of the dam section, taken in the direction of arrows substantially along the line IV—IV of FIG. 2.

A center pillar or pipe-shaped structural part 8 forming part of the vehicle body structure side part is constructed of panels (pressed steel plates) The center pillar includes a first section with a generally C shaped cross-section, comprised of s single panel 9, and a second section having a generally flat shape, comprising a single panel as shown in FIG. 4. The first and second sections are fixedly secured to each other, to define therebetween a generally vertically extending inside space. The upper end section of the center pillar 8 is fixedly connected or joined with the roof side rail 6; however, the roof side rail 6 is not formed with an opening at the joint with the center pillar 10 so as to block communication between the inside space of the center pillar 8 and the inside space of the roof side rail 6. In other words, the upper end of the center pillar 8 is closed with the outer wall of the roof side rail 6. It will be understood that a portion of the roof side rail 6 closing the upper end of the center pillar 8 is formed with a relatively small air vent hole (not shown) in order to discharge air confined within the inside space of the center pillar during pouring flowable plastic into the inside space within the center pillar 8.

In this case, a high rigidity foamed plastic such as hard foamed polyurethane resin is poured into the inside spaces within the front pillar 1 and the center pillar 8. In this regard, a dam section 11 for damming the poured plastic is disposed within the inside space within the lower section of the front pillar 1, more specifically at a position near the level of the lower end of the outer panel of the first section 2. Additionally, another dam section 12 is disposed within the inside space of the center pillar 8 at a position at the generally same level as that of the front pillar dam section 11. It will be understood that it is preferable to reinforce the above-mentioned door hinge section by the poured plastic, and therefore the dam sections 11, 12 are provided at the position slightly below a door hinge section so that the poured plastic covers the door hinge section. A further dam section 13 is disposed within the upper end portion 2b of the front pillar 2 and located near each of the left and right side end sections of the front roof rail 7 in order to prevent the poured molten plastic from flowing from the side of the front pillar 2 to the side of the front roof rail 7.

In the front pillar, the first section is formed with an operation opening 14 of a suitable size which opening is located at the level slightly below the dam section 11. Similarly, the second section of the center pillar 10 is formed with another operation opening of a suitable size which opening is located at the level slightly below the dam section 12. Additionally, the second section of the front pillar is formed with a flowable plastic pouring hole 16 which are located spaced from each other and respectively at the different levels. Similarly the second section of the center pillar is formed with a flowable plastic pouring hole 17.

FIG. 3 illustrates the cross-sectional structure of the vicinity of the dam section 11 at the lower section of the front pillar 1, in a state just before a painting step of the vehicle body structure S, i.e., at the step just after a vehicle body structure assembly step. In this step, the dam section 11 has not yet been formed or completed. As shown in FIG. 3, a foamable rubber 18 of the band shape which has not yet foamed is attached onto inner surface of the front pillar inner 3 and the brace hinge 5 in such a manner to cover the generally whole inner periphery of the front pillar 1 at the level corresponding to the dam section 11. In this case, the rubber 18 is made of butyl rubber containing a foaming agent and has a width of about 20 mm. As shown, the brace hinge 5 is such shaped as to divide the inside space of the front pillar 1 into larger and smaller spaces 20, 21 in the position corresponding to the dam section 11. The larger space 20 is larger in cross-sectional area than the smaller space 21. Concerning the larger space 21, the band-shaped foamable rubber 18 is attached on the generally whole inner periphery of the wall surface in the position corresponding to the dam section 11. Concerning the smaller space 21, superposed two band-shaped foamable rubbers 18 are attached onto the side of the outer and inner panels of the first section 2, 4.

FIG. 4 illustrates the cross-sectional structure of the vicinity of the dam section 12 in the center pillar 8 in the same state as in FIG. 3. Also in this structure, the band-shaped foamable rubber 18 which have not yet foamed are attached on the inner surface of the panels of the first and second sections 9, 10 in such a manner as to cover the generally whole inner peripheral surface of the center pillar 8 at the position corresponding to the dam section 8.

Figure 5:
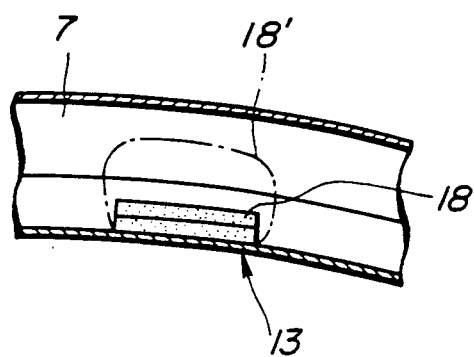
FIG. 5 is a cross-sectional view of a dam section of a third part of the vehicle body structure in a state before completion of formation of the dam section, taken in the direction of arrows substantially along the line V—V of FIG. 2.
Figure 6:
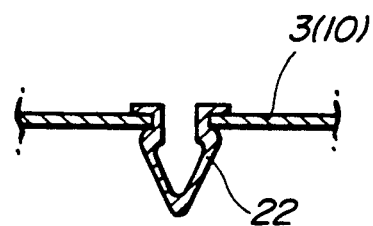
FIG. 6 is a cross-sectional view showing the installation state of a grommet in the vehicle body structure of FIG. 2.

FIG. 5 illustrates the cross-sectional structure in the vicinity of the dam section 13 in the upper end portion 2b of the front pillar 1 in the same state as in FIG. 3. In this structure, the superposed band-shaped foamable rubbers 18 are attached only on the lower side inner surface of the front pillar upper end portion 2b at the position corresponding to the dam section 13.

The manner of production of the vehicle body structure S will be discussed hereinafter.

First, the band-shaped foamable rubbers 18 which have not yet foamed are attached on the inner surface of pressed steel outer panels as the materials for the front pillar 1 and the center pillar 8, at the positions corresponding to the respective dam sections 11, 12, 13. These foamable rubbers 18 can be securely attached onto the surface of the outer panels under the adhesion of the foamable rubber 18 itself so that adhesive or the like is unnecessary. Additionally, the foamable rubber 18 can absorb oil and therefore possibly attached the on the surface of the outer panel even under a condition oil is adhered on the surface of the outer panel.

The outer panels provided with the foamable rubbers 18 are carried into an assembly line to be assembled upon accomplishing spot-welding thereby to obtain the vehicle body structure S as shown in FIG. 2. The thus assembled vehicle body structure S is carried to a painting line in which under-coating is carried out by an electrodeposition painting followed by drying under heating and baking. The foamable rubber 18 is, for example, of the type of being foamed at about 180° C. Accordingly, the rubber 18 foams to expand in volume at the temperature in a painting step to obtain a foamed rubber 18' as shown in FIGS. 1, 4 and 5.

By such foaming of the foamable rubber 18, the smaller space 21 of the front pillar 1 is fully closed with the foamed rubber 18 as shown in FIG. 1, while the larger space 20 of the front pillar 1 and the space of the center pillar 8 are foamed only along the inner periphery thereby leaving a central space or opening A as shown in FIGS. 1 and 4.

When the painting step is completed, the vehicle body structure S is carried to a fitting-out line in which a water drain hose 19 (shown in FIG. 1) is inserted into the front pillar 1 in case of installing the sunroof. This water drain hose 18 is disposed to pass through the central opening A so as to contact with the inner periphery of the foamed rubber 18' in the dam section 11. Subsequently, a relatively soft foamed member 23 made of a soft foamed polyurethane resin is manually inserted through the operation opening 14, 15 into the pillar 1, 8 and forced into the central opening A of the foamed rubber 18'. The foamed member 23 has been previously cut into a block having a suitable size. It will be understood that the foamed member 23 is securely kept in position by virtue of elasticity of itself and of the foamed rubber 18'. It is to be noted that the foamed member 23 is disposed only in the dam sections 11, 12, so that the dam section 13 in the front pillar upper end portion 2b is constituted only by the foamed rubber 18' without the foamed member 23.

The second section of the front pillar 3 and the second section of the center pillar 10 are formed with openings for installation of garnishes (not shown) or the like. These installation openings have been previously filled with plastic grommets 22 to receive clips (not shown). The grommet 22 may be replaced with the foamable rubber 18 (not yet foamed) which is attached on the inner wall surface of the second section of the front pillar 3 on the second section of the center pillar 10 to cover the installation opening. The foamable rubber 18 is foamed at the painting step so as to become the foamed rubber 18', thereby obtaining a space into which the clip or a small screw is inserted.

Upon completion of the above-discussed preparation step, a predetermined amount of the material of the hard and high density foamed polyurethane resin is poured through the pouring holes 16, 17 into the front pillar 1 and the center pillar 8. The thus poured resin material hardens during a relatively short time, in which it is prevented from flowing to the bottom sections under the action of the dam sections 11, 12 so as be uniformly filled in the inside of the front pillar 1 and the center pillar 8. Concerning the front pillar 1, the resin material is filled into the upper end portion 2a of the front pillar 1 but not filled into the other upper end portion 2b under the action of the dam section 13. Concerning the center pillar 8, the resin material is filled to the upper end of the center pillar 8 at which end the center pillar 8 is connected with the roof side rail 6. The thus filled resin material hardens to become the hard and high density foamed polyurethane resin. This foamed polyurethane resin effectively reinforces the front pillar 1 and the center pillar 8.

It will be understood that a part of the thus filled resin material of the hard foamed polyurethane resin may foam slightly later than a major part of the resin material thereby to increase a pressure due to foaming within the front pillar 1 and the center pillar 8. However, such a pressure can be absorbed under the deformation of the dam section 11, 12 because the dam section 11, 12 is formed of the soft foamed rubber 18' and the foamed member 23. As a result, the foaming pressure can be prevented from an excessive rise within the space confined in the pillar, thereby securely preventing ejection of the resin material through a small clearance formed between the joined outer panels of, for example the first and second sections of the front pillar.

What is claimed is:

1. A vehicle body structure, having a pipe-shaped structural part, comprising:

foamed rubber attached to on the inner surface of said pipe-shaped structural part, said foamed rubber defining an opening inside said pipe-shaped structural part;

a foamed member inserted in said opening so as to form a dam section for blocking a section of said pipe-shaped part, said dam section defining an inside space within said pipe-shaped structural part; and a hard and highly rigid foamed resin formed in said inside space.

2. A vehicle body structure as claimed in claim 1, wherein said foamed rubber is generally annular and is formed along the inner periphery of said pipe-shaped structural part.

3. A vehicle body structure as claimed in claim 2, wherein said foamed member is disposed in a central opening, said central opening being defined by said annular foamed rubber.

4. A vehicle body structure as claimed in claim 1, wherein said foamed resin is hard and high density polyurethane resin.

5. A structural member for an automotive vehicle comprising:

a pipe-shaped member defining an inside space therein; and a partition member connected to an inside surface of said pipe-shaped member, said partition member dividing said inside space into two spaces, said partition member including foamed rubber which is attached to said pipe-shaped inner surface, said foamed rubber defining an opening, and wherein said opening is then closed by a foamed member.

6. A structural member as claimed in claim 5, further comprising a hard, highly rigid foamed resin which substantially fills one of said two spaces divided by said partition member.

7. An arrangement for damming a flowable plastic in a pipe-shaped structural member, comprising a band-shaped foamed rubber member attached to a predetermined short portion of the inner surface of said pipe-shaped structural member, said band-shaped foamed rubber member partitioning the interior of said pipe-shaped member into first and second spaces;

an opening which is defined by said foamed rubber and located inside said pipe-shaped structural member; and a foamed member inserted in said opening.

8. A damming arrangement as claimed in claim 7, wherein said band-shaped foamed rubber member is narrow in the elongate direction of said pipe-shaped structural member and extends into the pipeshaped structure to partition the interior of said pipe-shaped structure into first and second spaces.

9. A damming arrangement as claimed in claim 7, further comprising a hard and high rigidity foamed resin which is filled in one of said first and second spaces divided by said band-shaped foamed rubber member.

* * * * *